United States Patent
Hillis et al.

(10) Patent No.: US 6,714,234 B1
(45) Date of Patent: Mar. 30, 2004

(54) MAINTAINING EYE-CONTACT IN TELECONFERENCING USING STRUCTURED LIGHT

(75) Inventors: W. Daniel Hillis, Encino, CA (US); Bran Ferren, Beverly Hills, CA (US)

(73) Assignee: Applied Minds, Inc., Glendale, CA (US)

( * ) Notice: Subject to any disclaimer, the term of this patent is extended or adjusted under 35 U.S.C. 154(b) by 0 days.

(21) Appl. No.: 10/121,562

(22) Filed: Apr. 11, 2002

Related U.S. Application Data

(60) Provisional application No. 60/283,158, filed on Apr. 11, 2001.

(51) Int. Cl.[7] .............................................. H04N 7/14
(52) U.S. Cl. .................................. 348/14.16; 348/14.07
(58) Field of Search ........................... 348/14.01, 14.07, 348/14.08, 14.12–14.16

(56) References Cited

U.S. PATENT DOCUMENTS

| | | | | |
|---|---|---|---|---|
| 2,895,005 A | * | 7/1959 | Kock et al. ............... | 348/14.16 |
| 3,116,365 A | * | 12/1963 | Prescott ................... | 348/14.16 |
| 5,117,258 A | | 5/1992 | Iwata ........................ | 355/201 |
| 5,430,473 A | * | 7/1995 | Beecher, II et al. ..... | 348/14.16 |
| 5,500,671 A | | 3/1996 | Andersson et al. ........... | 348/15 |
| 5,612,734 A | | 3/1997 | Nelson et al. ................ | 348/20 |
| 6,507,357 B2 | * | 1/2003 | Hillis et al. .............. | 348/14.16 |

* cited by examiner

Primary Examiner—Wing Fu Chan
(74) Attorney, Agent, or Firm—Glenn Patent Group; Michael A. Glenn

(57) ABSTRACT

The invention comprises a structured light projector, a video camera, and an image processor, for achieving perspective corrected images that enhance eye-contact during teleconferencing. A structured light projector is offset in one direction from the monitor center, and illuminates a local participant with a structured light pattern. The image of the local participant, illuminated by both ambient and structured light, is captured by the video camera, also offset from the monitor center, preferably in the direction opposite the structured light projector. By considering the distortion of the structured light observed from the position of the video camera and the position of the structured light projector and video camera relative to the monitor center, an image processor creates an image of the local participant as viewed from a perspective that, when viewed by the remote participant, provides a sense of eye contact with the local participant.

18 Claims, 4 Drawing Sheets

MAINTAINING EYE-CONTACT IN TELECONFERENCING USING STRUCTURED LIGHT

CROSS-REFERENCE TO RELATED APPLICATIONS

This application claims priority to U.S. Provisional Patent application Ser. No. 60/283,158 filed Apr. 11, 2001

BACKGROUND OF THE INVENTION

1. Technical Field

The invention relates to teleconferencing. In particular, the invention relates to methods and systems that permit the appearance of eye-contact to be maintained between participants in a teleconference

2. Description of the Prior Art

A primary concern with video teleconferencing systems is the frequent lack of eye-contact between participants. In the most common configuration, each participant uses a computer monitor on which an image of the remote participant is displayed, while a camera mounted above the monitor captures an image of the local participant for display on the monitor of the remote participant. Because participants frequently look at either at the image of the remote participant or elsewhere on the display, rather than directly at the video camera, there is the appearance that the participants are not looking at one another. This results in an unsatisfactory user experience.

Prior art solutions to the eye-contact problem have incorporated half-silvered, partially transmissive and partially reflective mirrors, or beamsplitters. These solutions have typically incorporated a beamsplitter placed in front of a computer display at a 45 degree angle. In one typical configuration, a video camera, located behind the beamsplitter, captures the image of the local participant through the beamsplitter. The local participant views an image of the remote participant on the display as reflected by the beamsplitter.

In devices incorporating a conventional CRT, the resulting device is both bulky and physically cumbersome. In cases involving an upward facing display, the display is viewable both directly and as reflected by the beamsplitter, greatly distracting the local participant. To alleviate this problem, prior solutions, including those described in U.S. Pat. Nos. 5,117,285 and 5,612,734 have introduced complicated systems involving polarizers or micro-louvers to obstruct a direct view of the upward facing display by the local participant. In all cases, the image of the remote participant appears recessed within the housing holding the display, beamsplitter, and video camera. The resulting distant appearance of the remote participant greatly diminishes the sense of intimacy sought during videoconferencing.

Another set of prior art attempts seeks to alleviate this problem through the use of computational algorithms that manipulate the transmitted or received video image. For example, U.S. Pat. No. 5,500,671 describes a system that addresses the eye-contact problem by creating an intermediate three-dimensional model of the participant based on images captured by two video cameras on either side of the local display. Using this model, the system repositions artificially generated eyes at an appropriate position within the image of the local participant transmitted to the remote participant. The resulting image, with artificially generated eyes and a slight but frequent mismatch between the position of the eyes relative to the head and body of the participant, is unnatural in appearance. Furthermore, the creation of an intermediate three-dimensional model is complex and time-consuming, making it difficult to implement in practice.

A further weakness of these and other similar approaches is an inability to handle all possible participant postures and movements. More robust algorithms are possible and several have been proposed, but these approaches are more computationally complex, and cannot be executed rapidly enough on current microprocessors to allow for real time processing of high resolution video images. Finally, many of these approaches require that the remote communicant own and operate the same videoconferencing device. This presents a significant obstacle to introduction and widespread adoption of the device.

What is needed is a device that incorporates at once all of the beneficial features achieved by the prior art, while addressing the aforementioned deficiencies. First and foremost, the device must offer eye-contact in a robust manner, operating effectively across the full range of local participant head positions and gaze directions. It must provide a natural view of the remote participant for the local participant. It must be aesthetically pleasing and easily operated by a typical user. The underlying algorithm must be computationally simple enough to be conducted in real time on high frame rate, high resolution video. Finally, the device should require little if any additional videoconferencing equipment beyond that found in a typical existing videoconferencing setup.

SUMMARY OF THE INVENTION

The invention comprises a structured light projector, a video camera, and an image processor, for achieving perspective corrected images that enhance eye-contact during teleconferencing. A structured light projector is offset in one direction from the monitor center, and illuminates a local participant with a structured light pattern. The image of the local participant, illuminated by both ambient and structured light, is captured by the video camera, also offset from the monitor center, preferably in the direction opposite the structured light projector. By considering the distortion of the structured light observed from the position of the video camera and the position of the structured light projector and video camera relative to the monitor center, an image processor creates an image of the local participant as viewed from a perspective that, when viewed by the remote participant, provides a sense of eye contact with the local participant.

DETAILED DESCRIPTION OF THE INVENTION

Physical Description of the Invention

Figure 1:
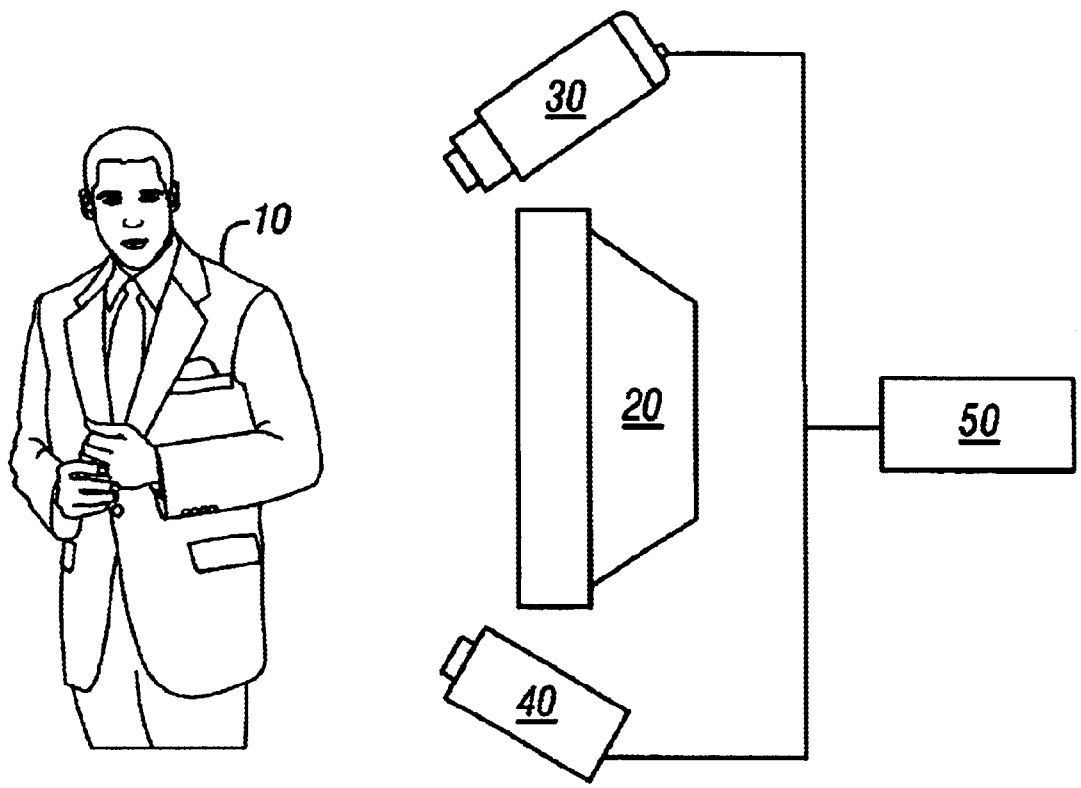
FIG. 1 is a block schematic diagram which shows a preferred embodiment of the invention.

The presently preferred embodiment of the invention, as shown in block schematic form in FIG. 1, comprises three primary components:

a structured light projector;
a video camera; and
an image processor.

The structured light projector 40 provides a source of structured light. In the preferred embodiment, the structured light projector projects a pattern of infrared light, so that the structured light is not visible to either the local or remote participant. The structured light pattern preferably comprises a series of horizontal lines. In the discussion of and figures for the preferred embodiment that follow, the pattern of infrared light is illustrated as white lines on a black field—white corresponding to full infrared illumination and black corresponding to no infrared illumination. The width of each horizontal line is approximately equal to the spacing between adjacent lines. Satisfactory results may be achieved with a pattern comprising approximately twenty such lines.

Such a projector can be constructed by replacing the existing bulb in a standard slide projector with an infrared light source, preferably a high output infrared light emitting diode. In this case, the desired structured light pattern may be reproduced on a slide inserted into the projector. Alternatively, a structured light projector may be obtained through the modification of a video projector, for example an LCD video projector.

Finally, several commercial products for producing structured light are well known in the art. For example, the invention may be practiced with a Stocker Yale Lasiris structured light laser.

The video camera 30 may be any known device for capturing images of the local participant 10 that is also capable of capturing the structured light pattern. To ensure that the Infrared structured light is undetectable by the remote participant, it may be desirable to use a camera having a separate channel for infrared image content. Such a camera collects and transmits the infrared image content in an infrared channel, I, alongside the standard R, G, and B channels. By eliminating the I channel from the transmission to the remote participant, the structured light is removed from the image of the local participant.

More commonly among video cameras offering infrared sensitivity, the infrared content of the image is mapped into the RGB channels transmitted to the remote camera. Accordingly, any infrared structured light captured by the camera would be displayed on the remote monitor within the human eye's sensitivity range. In this case, the structured light may be removed through the use of timing circuitry. This circuitry coordinates the structured light projector and video camera. Structured light is presented only periodically and for a short duration, for example less than the duration of a single frame of the video camera. The frames captured during structured light illumination are not transmitted to the remote location. In place of such frames, the previous frame may be repeated. Past experience converting film between formats with different framing rates has shown that the human eye cannot detect the occasional repetition of a single frame. Alternatively, the structured light may be presented in the vertical blanking interval of a first video camera, and captured by a second video camera.

The image processor 50 implements the inventive technique, which is discussed in greater detail below. The image processor is in communication with the video camera 30, and in some embodiments, the image processor is also in communication with the structured light projector 40.

A monitor 20 allows the local participant to view the remote participant.

Operation of the Invention

General Operation

The structured light projector 40 is preferably offset in one direction from the monitor 20 center, and illuminates the local participant 10 with a structured light pattern, in the preferred embodiment a series of substantially parallel lines. The lines are preferably oriented substantially perpendicular to the displacement of the structured light projector from the monitor center. An image of the local participant, illuminated by both ambient and structured light, is captured by a video camera 30 that is offset from the monitor center, preferably in a direction opposite that of the structured light projector.

The pattern of structured light projected onto the local participant appears as substantially straight, evenly spaced lines from, and only from, the perspective of the structured light projector. From all other perspectives, including that of the video camera, the lines of structured light are distorted as they traverse the physical features of the local participant.

By considering the particular distortion observed from the position of the video camera, the image processor is capable of producing an image of the local participant as viewed from perspectives other than that of the video camera. This is accomplished by first isolating the lines of structured light, and then calculating the amount of warping needed to restore the lines to a straight configuration. Performing the warping determined in this manner yields an image of the local participant as viewed from the position of the structured light projector. By performing only a fraction of the warping determined in this manner, the image processor can obtain an image of the local participant as viewed from a point along the line between the video camera and structured light projector. In particular it is possible to obtain an image of the local participant as seen from the monitor center. Such a view point, when displayed on the monitor of the remote participant, provides the remote participant with a sense of eye contact with the local participant.

It should be noted that optimal eye contact is achieved by providing an image of the local participant as seen from the location of the remote participant's eye on the local display. Typically, this point is very near the monitor center. However, in some embodiments of the invention, an adjustment may be made to more accurately track the position of the remote participants eyes on the local display and adjust the amount of warping performed accordingly A more detailed description of the process performed by the image processor is provided below.

Line Detection

Figure 2:
FIG. 2 shows a local participant illuminated by ambient and structured light according to the invention.

FIG. 2 shows the local participant illuminated by ambient and structured light according to the invention. The image processor begins the process of determining the requisite warping by isolating as precisely as possible the structured light lines from the image. In the preferred embodiment, the lines are detected by thresholding the results of a high pass convolution filtering operation. This can be summarized as $$L = T_l(H * G_1(P))$$

where P is the original image, $G_1$ is, for example, an 11×11 elliptical Gaussian filter having a horizontal standard deviation of two pixels and a vertical standard deviation of one pixel. H is a high pass filter, and l is the numerical value of the threshold operator T For example, $$H = \begin{bmatrix} 0 & -1 & -2 & -1 & 0 \\ -1 & 1 & 2 & 1 & -1 \\ -1 & 1 & 4 & 1 & -1 \\ -1 & 1 & 2 & 1 & -1 \\ 0 & -1 & -2 & -1 & 0 \end{bmatrix}$$

Alternatively, this operation can be performed on the difference between images obtained with and without structured light illumination. Specifically, $$L = T_l(H * G_1(P - P'))$$

where P is the original image with structured light and P' is the original image without structured light.

Figure 3:
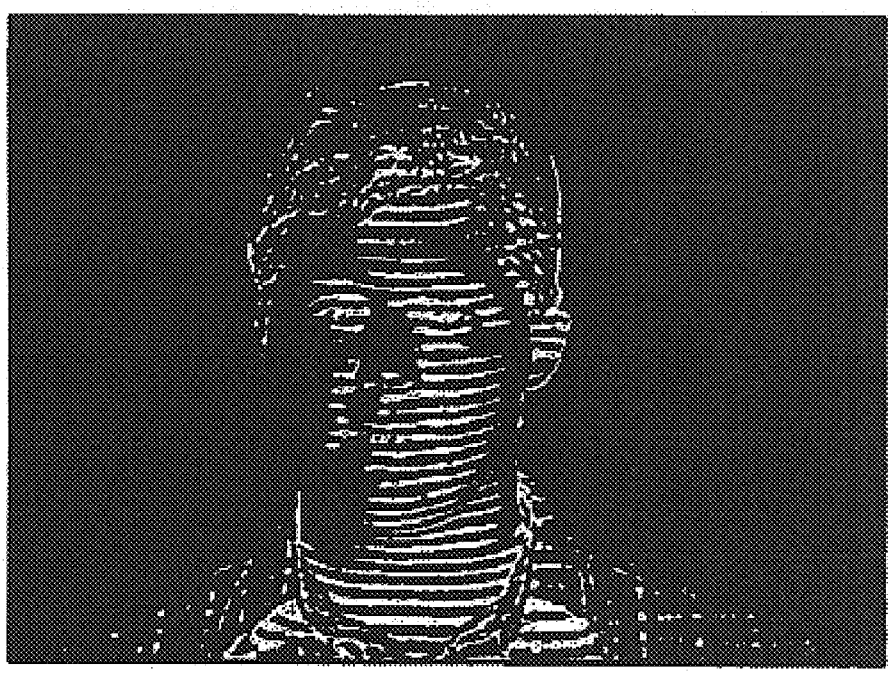
FIG. 3 shows the result of a line detection operation according to the invention.

FIG. 3 shows the result of the line detection operation. The image processor has succeeded in isolating the structured light lines, defining them more clearly than in FIG. 2. To determine the warping needed to return these lines to a straight configuration, the image processor first convolves the modified image, L, of FIG. 3 with two directional operators $$S = D_{se} * (D_{ne} * L)$$

Here, $$D_{se} = \begin{bmatrix} 0 & -1 & 0 \\ 1 & 0 & -1 \\ 0 & 1 & 0 \end{bmatrix}, \quad D_{ne} = \begin{bmatrix} 0 & 1 & 0 \\ 1 & 0 & -1 \\ 0 & -1 & 0 \end{bmatrix}.$$

The result of this directional calculation is a tri-valued image. Those pixels within the image through which a southeasterly line passes are valued 1, pixels through which a northeasterly line passes are valued -1, and all other pixels are zero-valued.

Figure 4:
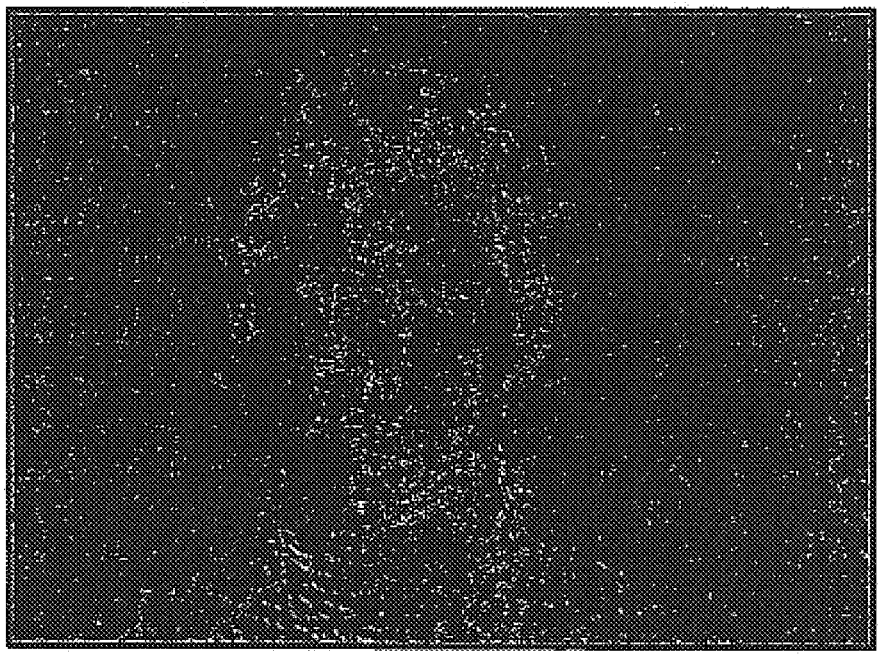
FIG. 4 shows the result of a directional convolution applied to the results shown in FIG. 3, where 1, −1, and 0 are represented by white, black, and gray pixels, respectively.

FIG. 4 shows the result of the directional convolution applied to FIG. 3, where pixel values of 1, -1, and 0 are represented by white, black, and gray pixels, respectively. The image processor then obtains a measure of the required warping by integrating this tri-valued image along lines parallel to the undistorted lines of structured light. For simplicity, the required warping may be determined and performed only within a region coincident with the head outline of the local participant, and the background is left unaltered.

Figure 5:
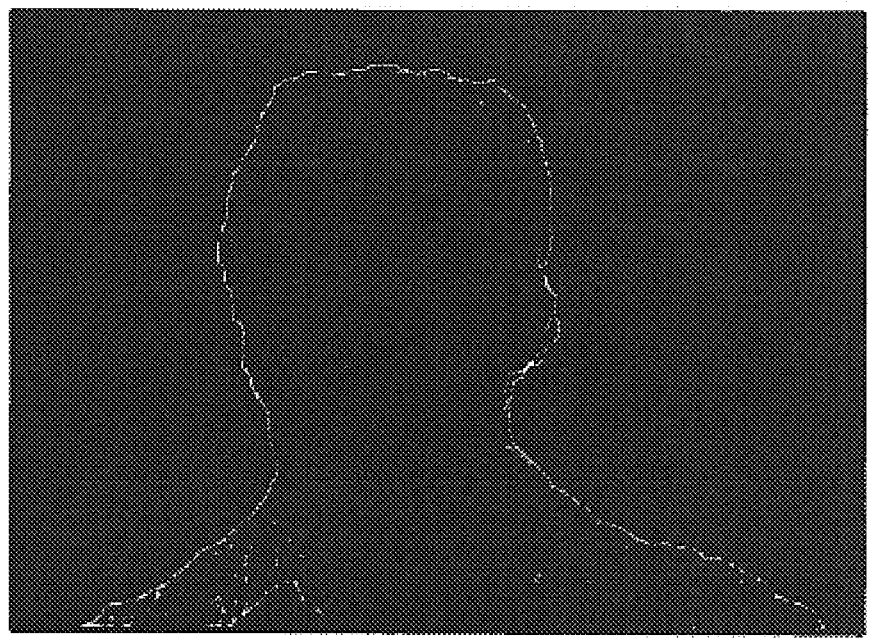
FIG. 5 shows the head outline of the local participant used for the image of FIG. 2.

FIG. 5 shows the head outline of the local participant for the image of FIG. 2. Accordingly, the integration is performed along lines parallel to the undeformed lines of structured light, with the limits of integration defined by the white region shown in FIG. 5. For horizontal lines of structured light, the required upward warping of each point is given by the sum of all pixel values left of the point but within the white outline of FIG. 5. Specifically, for lines of structured light aligned with a horizontal x-axis, $$W(x, y) = \int_{x_0(y)}^{x} S(x, y),$$

where $x_0(y)$ is a lower limit of integration determined by the left edge of the region defined in FIG. 5.

Figure 6:
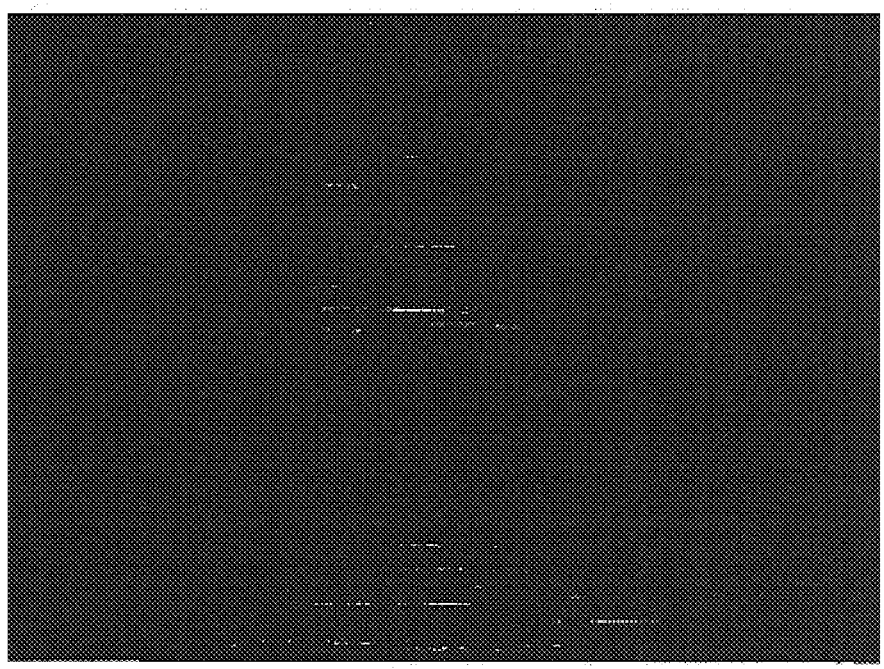
FIG. 6 shows the filtered result of a warping calculation according to the invention.

FIG. 6 shows the filtered result of the required warping calculation. The image processor uses a second filter, for example a circular Gaussian filter, to smooth the results to those shown. The results of this calculation indicate the warping required to return the structured lines to an undistorted configuration. Applying this warping to the image L provides an image of the local participant as seen from the viewpoint of the structured light projector.

To achieve an image of the local participant as viewed from the monitor display center, a fraction, approximately half, of this warping is performed. The precise fraction is preferably determined by the ratio of the camera to structured light projector distance and the camera to monitor center distance.

The may be accomplished with the "meshwarp" image warping routine developed by Douglas Smythe and Industrial Light and Magic. [A Simplified Approach to Image Processing—Classical and Modern Techniques in C, Randy Crane, Prentice Hall PTR, 1997, pp 223–230]. This algorithm constructs a new image given an initial image and a set of displacements for each pixel. Alternatively, an image warp based on bilinear interpolation or field based warping may be employed.

Figure 7:
FIG. 7 shows a final image produced according to the invention.
Figure 2:
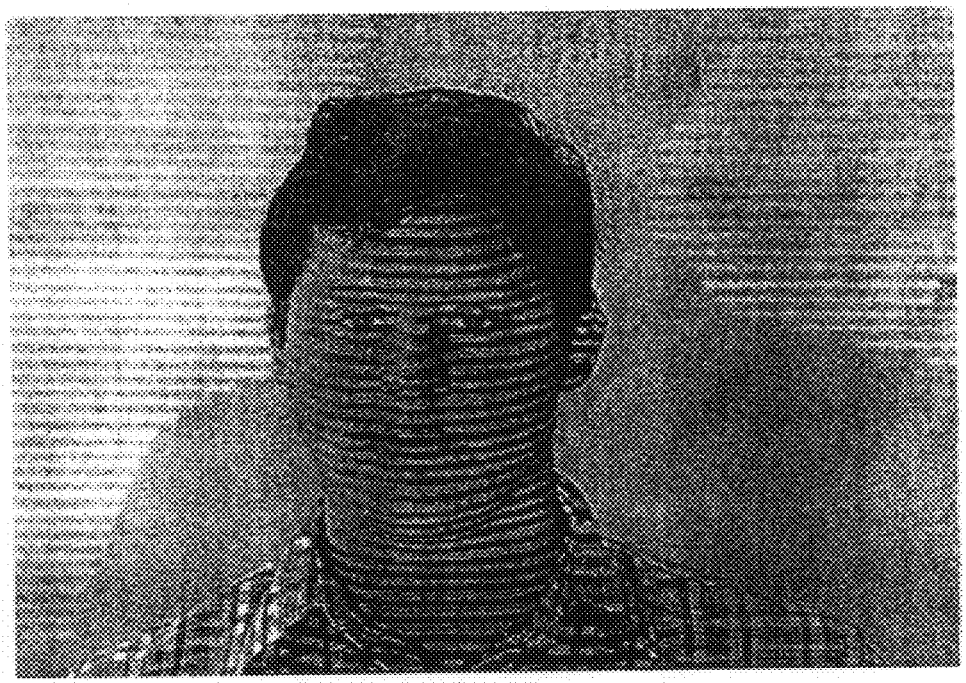
Figure 3:
Figure 4:
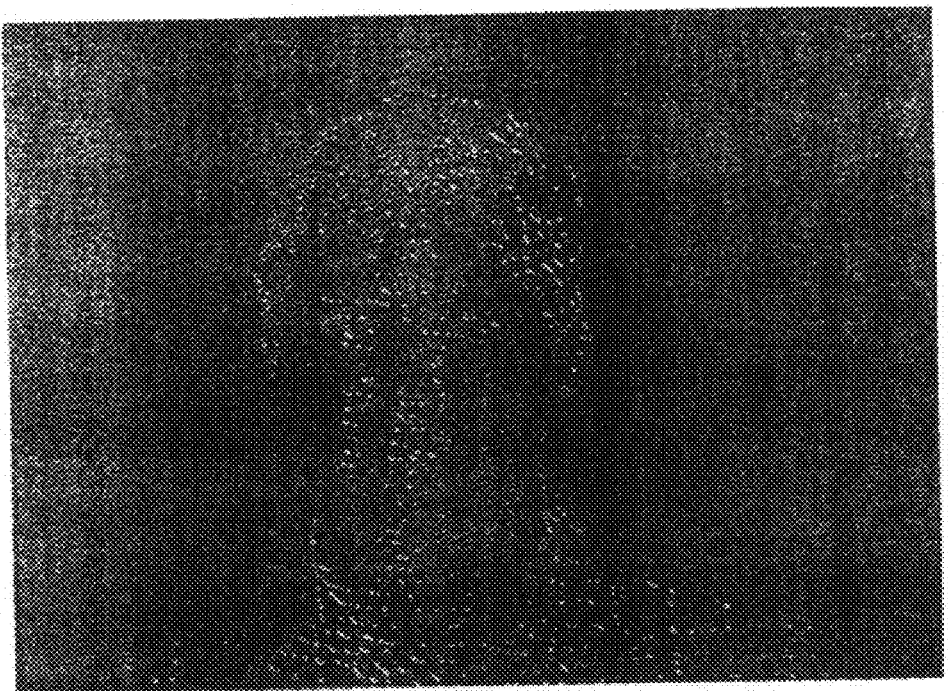
Figure 5:
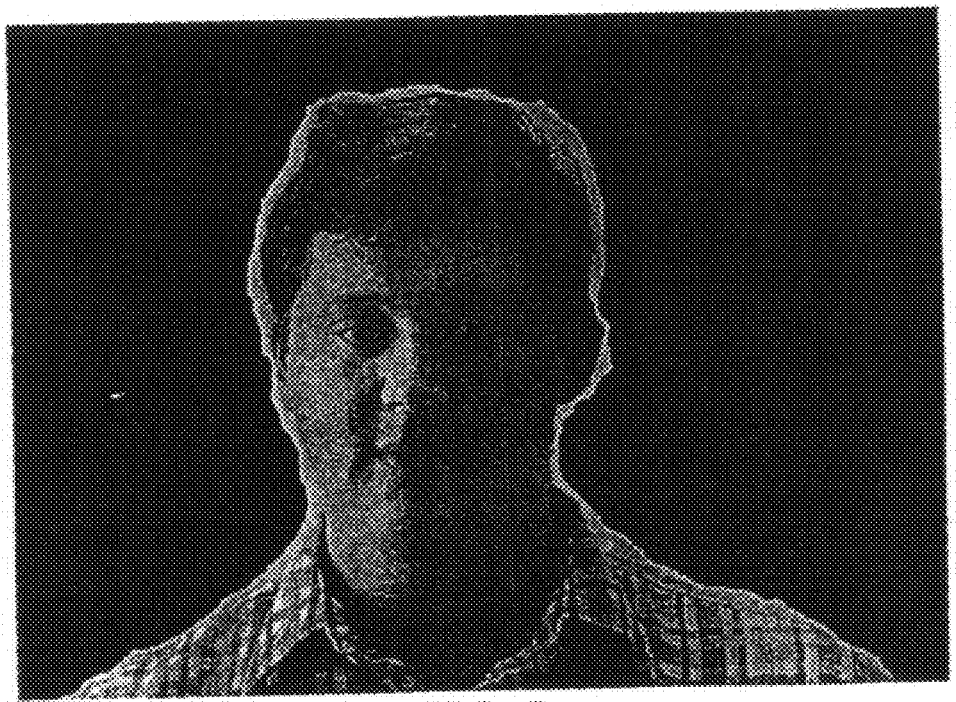
Figure 6:
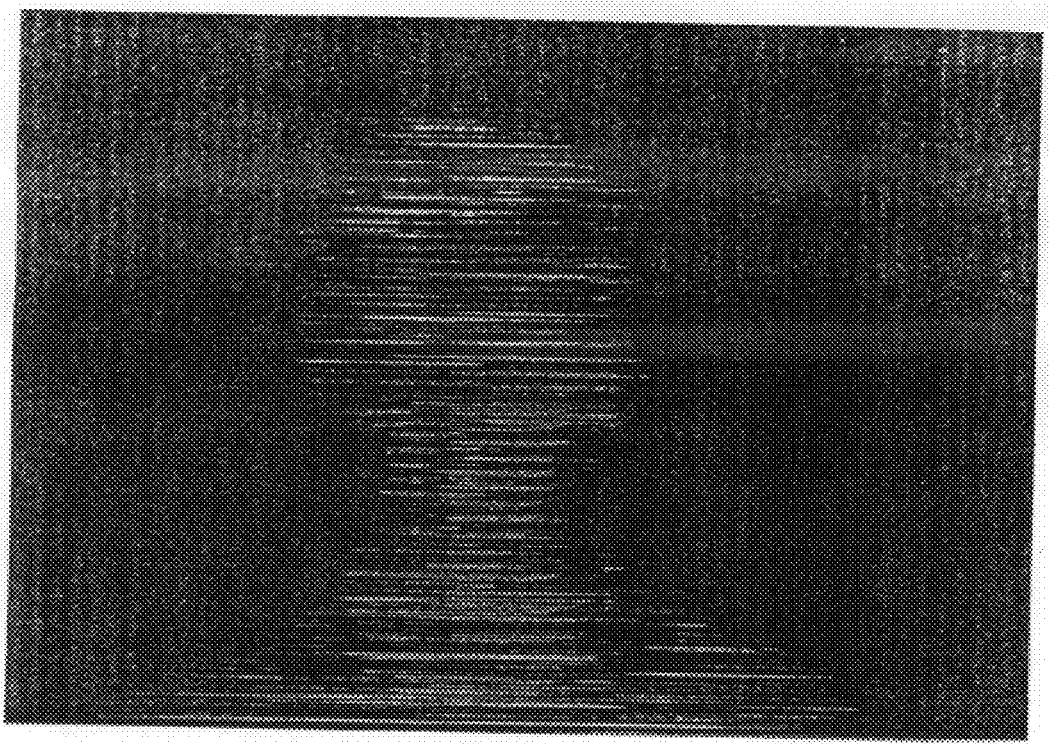
Figure 7:
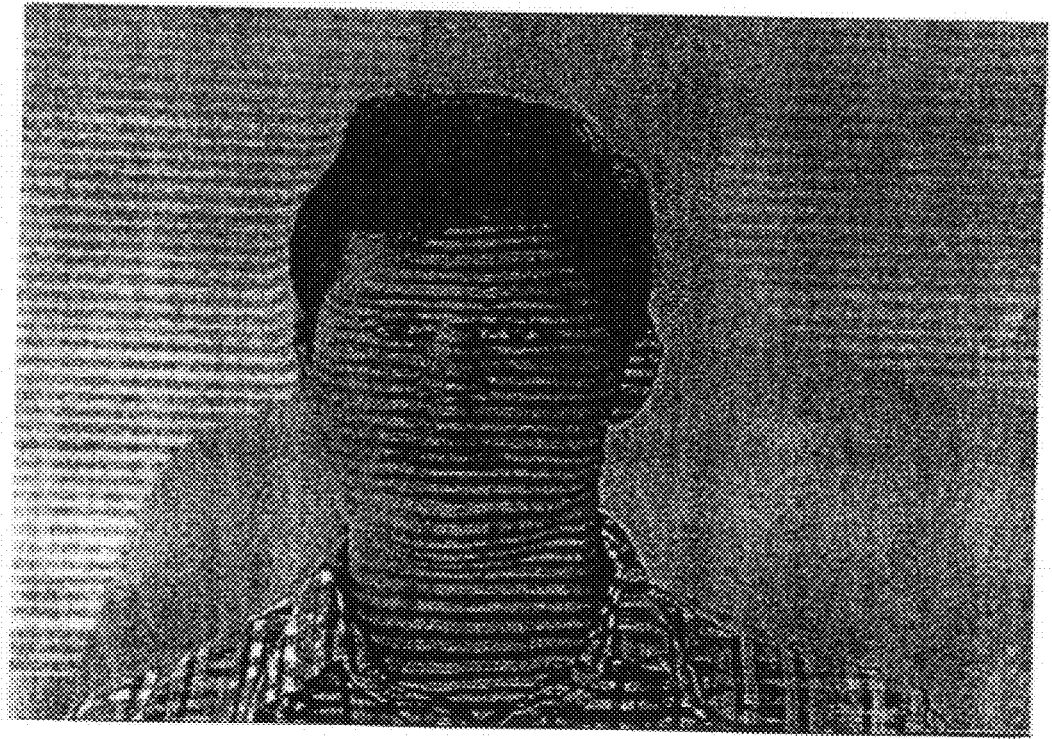

Regardless of the specific routine used, the result of this process is an image showing an estimate of the local participant as seen from the display center. This image is shown in FIG. 7.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for providing eye contact in a video conference, comprising the steps of:

illuminating a local participant with structured light from a first position;

obtaining an image of said local participant from a second position;

determining from distortion of said structured light illumination a requisite warping value for producing a head on view of said local participant; and applying said requisite warping to said image to yield a final image;

wherein said final image provides a head on view of said local participant when presented to a remote participant.

2. The method of claim 1, wherein said structured light illumination is in the infrared spectrum.

3. The method of claim 1, wherein said structured light illumination is only active during a vertical blanking interval of a video camera used in obtaining said image of said local participant.

4. The method of claim 1, wherein said determining step further comprises the step of:

applying a high pass convolution filter.

5. The method of claim 1, wherein said structured light comprises a series of substantially parallel lines.

6. The method of claim 5, wherein said determining step further comprises the step of:

applying at least one directional filter.

7. The method of claim 6, wherein said determining step further comprises the step of:

integrating a series of directional values along a line substantially parallel to said lines of structured light.

8. The method of claim 7, wherein limits of said integrating step are defined by a mask surrounding said local participant.

9. The method of claim 1, wherein said requisite warping value is applied using an image warping routine.

10. An apparatus for providing eye contact in a video conference, comprising:
- a source of structured light for illuminating a local participant with structured light from a first position;
- an imaging device for obtaining an image of said local participant from a second position;
- a processor for determining from distortion of said structured light illumination a requisite warping value for producing a head on view of said local participant; and for applying said requisite warping to said image to yield a final image;
- wherein said final image, provides a head on view of said local participant when presented to a remote participant.

11. The apparatus of claim 10, wherein said structured light illumination is in the infrared spectrum.

12. The apparatus of claim 10, wherein said structured light illumination is only active during a vertical blanking interval of a video camera used in obtaining said image of said local participant.

13. The apparatus of claim 10, wherein said processor further comprises:
- a high pass convolution filter.

14. The apparatus of claim 10, wherein said structured light comprises a series of substantially parallel lines.

15. The method of claim 14, wherein said processor further comprises:
- at least one directional filter.

16. The apparatus of claim 15, wherein said processor further comprises:
- means for integrating a series of directional values along a line substantially parallel to said lines of structured light.

17. The apparatus of claim 16, wherein limits of said integrating means are defined by a mask surrounding said local participant.

18. The apparatus of claim 10, wherein said requisite warping value is applied using an image warping routine.

* * * * *

UNITED STATES PATENT AND TRADEMARK OFFICE
CERTIFICATE OF CORRECTION

PATENT NO. : 6,714,234 B1
DATED : March 30, 2004
INVENTOR(S) : Hillis et al.

It is certified that error appears in the above-identified patent and that said Letters Patent is hereby corrected as shown below:

Drawings,
Sheet 2 of 4, replace "Figure 2 and Figure 3" with -- "Replacement Figure 2 and 3". --
Sheet 3 of 4, replace "Figure 4 and Figure 5" with -- "Replacement Figure 4 and 5" --
Sheet 4 of 4 replace "Figure 6 and 7" with -- "Replacement Figure 4 and 5" --

Signed and Sealed this

Twenty-fourth Day of May, 2005

JON W. DUDAS
*Director of the United States Patent and Trademark Office*